United States Patent
Nissen

(10) Patent No.: US 7,626,069 B2
(45) Date of Patent: Dec. 1, 2009

(54) METHOD FOR CLEANING TAR-BEARING WASTE WATER AND APPARATUS FOR PERFORMING SAID METHOD

(75) Inventor: Thomas Nissen, Nyborg (DK)

(73) Assignee: Babcock and Wilcox Volund APS, Esbjerg (DK)

( * ) Notice: Subject to any disclaimer, the term of this patent is extended or adjusted under 35 U.S.C. 154(b) by 0 days.

(21) Appl. No.: 12/029,845

(22) Filed: Feb. 12, 2008

(65) Prior Publication Data

US 2008/0214885 A1    Sep. 4, 2008

Related U.S. Application Data

(63) Continuation of application No. 10/480,588, filed as application No. PCT/DK02/00398 on Jun. 13, 2002, now Pat. No. 7,396,454.

(30) Foreign Application Priority Data

Jun. 13, 2001   (DK) ............................... 2001 00919

(51) Int. Cl.
C07C 7/00    (2006.01)

(52) U.S. Cl. ...................................... 585/802; 585/804

(58) Field of Classification Search .................... 203/10; 208/4, 6, 7, 39, 41; 585/800, 802, 804, 899
See application file for complete search history.

(56) References Cited

U.S. PATENT DOCUMENTS

| 2,930,753 A | * | 3/1960 | McMahon ................... 203/10 |
| 4,279,693 A | | 7/1981 | Künlein et al. |
| 4,315,757 A | | 2/1982 | Woodmansee |

* cited by examiner

*Primary Examiner*—Glenn Caldarola
*Assistant Examiner*—Randy Boyer
(74) *Attorney, Agent, or Firm*—Stites & Harbison PLLC; Douglas E. Jackson

(57) ABSTRACT

In a method and an apparatus for cleaning tar-bearing waste water (17), a mixture of water and hydrocarbons, e.g. comprising polyaromatic hydrocarbons and phenols, the mixture is separated into a low-boiling-point part and a high-boiling-point part, bringing the low-boiling-point part on vapor form in a boiler (1), and the low-boiling-point part is cracked in vapor form at a high temperature in a reactor (2), providing light combustible gases, which can be utilized in e.g. gas engines, gas turbines or the like. Furthermore, the high-boiling-point part may be used for energy supply to the process or other processes or as an alternative be cracked for providing light combustible gases.

11 Claims, 2 Drawing Sheets

METHOD FOR CLEANING TAR-BEARING WASTE WATER AND APPARATUS FOR PERFORMING SAID METHOD

CROSS REFERENCE TO RELATED APPLICATIONS

This application is a continuation of application Ser. No. 10/480,588, filed May 19, 2004 now U.S. Pat. No. 7,396,454, which is the National Stage of International Application No. PCT/DK02/00398, filed Jun. 13, 2002 (which are hereby incorporated by reference).

TECHNICAL FIELD

The present invention relates to a method for cleaning tar-bearing waste water and an apparatus for performing the method.

BACKGROUND ART

In gas production, based on gasification of biomass, coal, etc., it is well-known that the produced gas contains tar, which in connection with the use of the gas in e.g. internal combustion engines or gas turbines, has to be removed from the produced gas. The traditional way of removing the tar is by cooling the gas, whereby the tar and possible water is condensed, leaving a relatively clean gas and a separated mixture of water and tar.

The mixture of water and tar cannot be disposed of to the environment due to the content of tar, including polyaromatic hydrocarbons and phenols, which are considered environmentally unsafe, possibly carcinogenic, poisonous, etc. Furthermore, the acidity of the mixture may also constitute an environmental problem.

It has been suggested to use ultraviolet light-induced wet oxidation or adsorption on various coke sorbents to clean the waste water. However, electric energy consumption is relatively high for the ultraviolet light-induced wet oxidation and the adsorption has certain limitations due to the presence of non-absorbable compounds.

It has been suggested (Swedish application 402214) that the waste water is evaporated and separated into a combustible tar fraction and a (more or less) clean steam fraction. The combustible fraction is subsequently burned (oxidized) to provide heat for the evaporation process—either by direct contact or through a heat exchanger. However, in this way the calorific value of the tar is converted directly to heat, which severely limits the utilization in high efficiency power producing machinery—specifically gas engines and gas turbines. Therefore, the application of the technology suggested will be limited to steam turbines and other equipment based on external firing.

BRIEF SUMMARY OF THE INVENTION

It is the object of the present invention to provide a method for cleaning tar-bearing waste water and an apparatus for performing said method of the kind referred to above, with which it is possible to provide a high efficiency of the process. By high efficiency is meant high cleaning capability and also efficient recovery of the energetic content in the tar contaminants for direct use in a gas-engine or gas turbine. This also implies, that in contrast with Swedish application 402214—where the contaminants are oxidized—the present invention describes a cracking process conducted under reducing conditions, where the high molecular tars and acids are transformed into light combustible gases which can be utilized in e.g. gas engines, gas turbines or the like. This object is achieved with a method for cleaning tar-bearing waste water and an apparatus for performing said method of said kind, which according to the present invention also comprises the features set forth hereafter. With this arrangement, a relatively clean part of the waste water on vapor form is cracked at a high temperature providing energy containing light combustible gases for use in e.g. gas engines, gas turbines or the like, and at the same time a high-boiling-point part of the waste water is provided, which is a combustible concentrate of the waste water, which may be used for heating purposes. Preferred embodiments of the method and apparatus are revealed hereinafter as well.

BRIEF DESCRIPTION OF THE DRAWINGS

In the following detailed part of the present description, the invention will be explained in more detail with reference to the exemplary embodiments of an apparatus for performing the method in accordance with the present invention shown in the drawings, in which.

DESCRIPTION OF THE PREFERRED EMBODIMENTS

Figure 1:
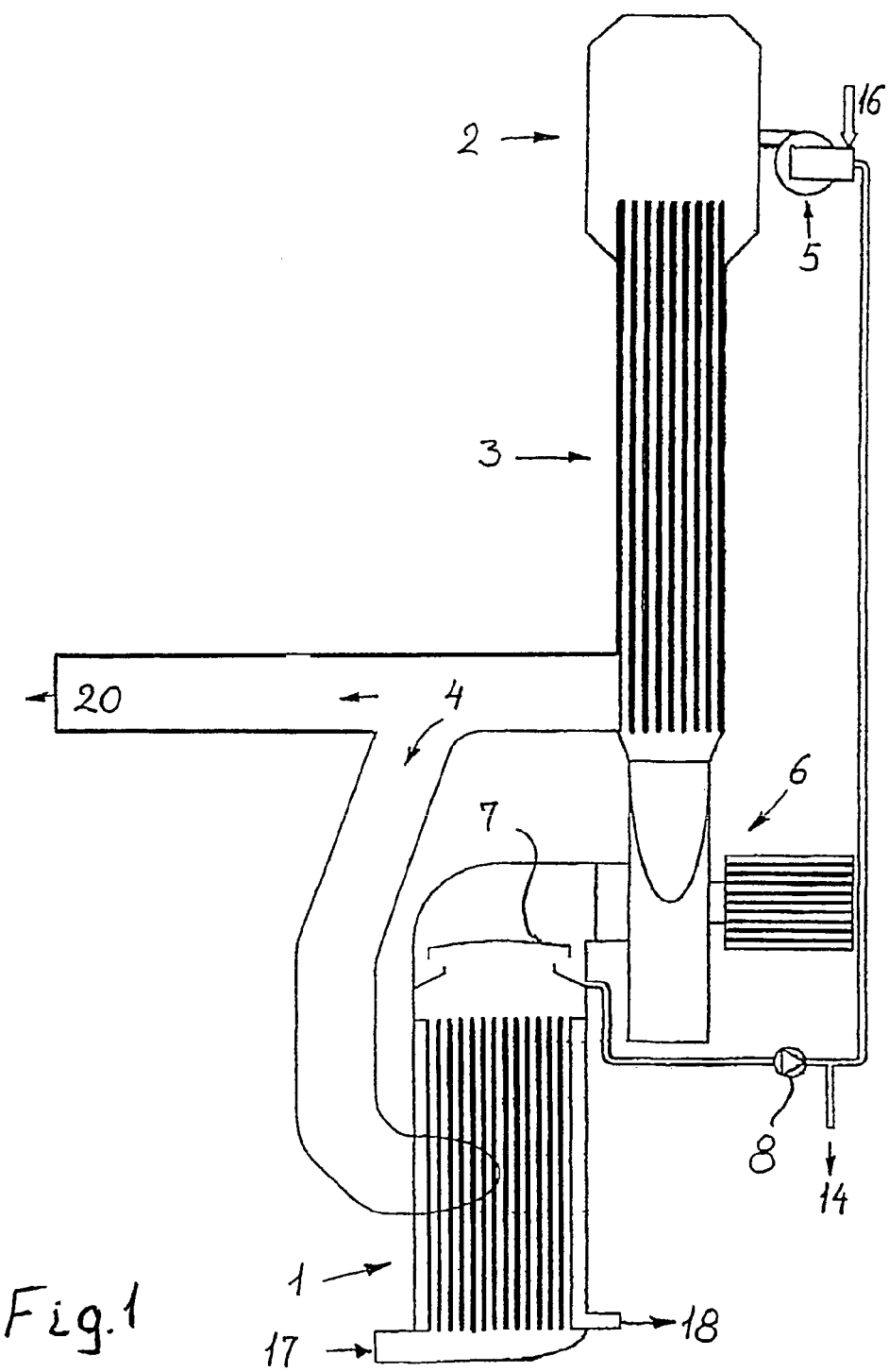
FIG. 1 schematically shows an apparatus in accordance with the present invention, and FIG. 2 schematically shows a flow scheme of an alternative apparatus in accordance with the present invention.

The apparatus shown in FIG. 1 is suited for cleaning tar-bearing waste water, e.g. coming from a biomass gasification unit, i.a. as described in EP-A-953,627. The apparatus comprises an evaporator 1 receiving the tar-containing water 17 at the bottom for completely evaporation in the evaporator 1. Before leaving the evaporator 1, a high-boiling-point part is separated by means of a droplet separator 7, said high-boiling-point part being pumped away by means of a concentrate pump 8. The low-boiling-point part is moved onwards by a high-pressure fan 6 feeding a heat exchanger 3, in which the low-boiling-point part is heated up to a relatively high temperature before entering the reactor 2, in which the low-boiling-point part is cracked in order to reduce its contents of hydrocarbons to an environmentally acceptable level, said cracking reactor 2 comprising a burner 5 supplied with concentrate from the pump 8 and combustion air 16, thus heating up the reactor 2 by burning off at least part of the concentrate separated out by means of the droplet separator 7. The cracked product leaving the reactor 2 is fed downwards in the heat exchanger 3 whereby it is cooled down by the heat exchange with the low-boiling-point part in counterflow. The cooled down cracked product 4 leaving the heat exchanger 3 is split up into two portions, one fed to the evaporator 1 providing heat for evaporation of the tar-containing water, whereby this part of the cracked product 4 is condensed and leaves the evaporator 1 in the form of relatively clean water 18, sufficiently clean to be led to the sewer system. Another part of the cracked product 4 leaving the heat exchanger 3 can be used as gasification medium in the associated gasifier as indicated at 20.

Figure 2:
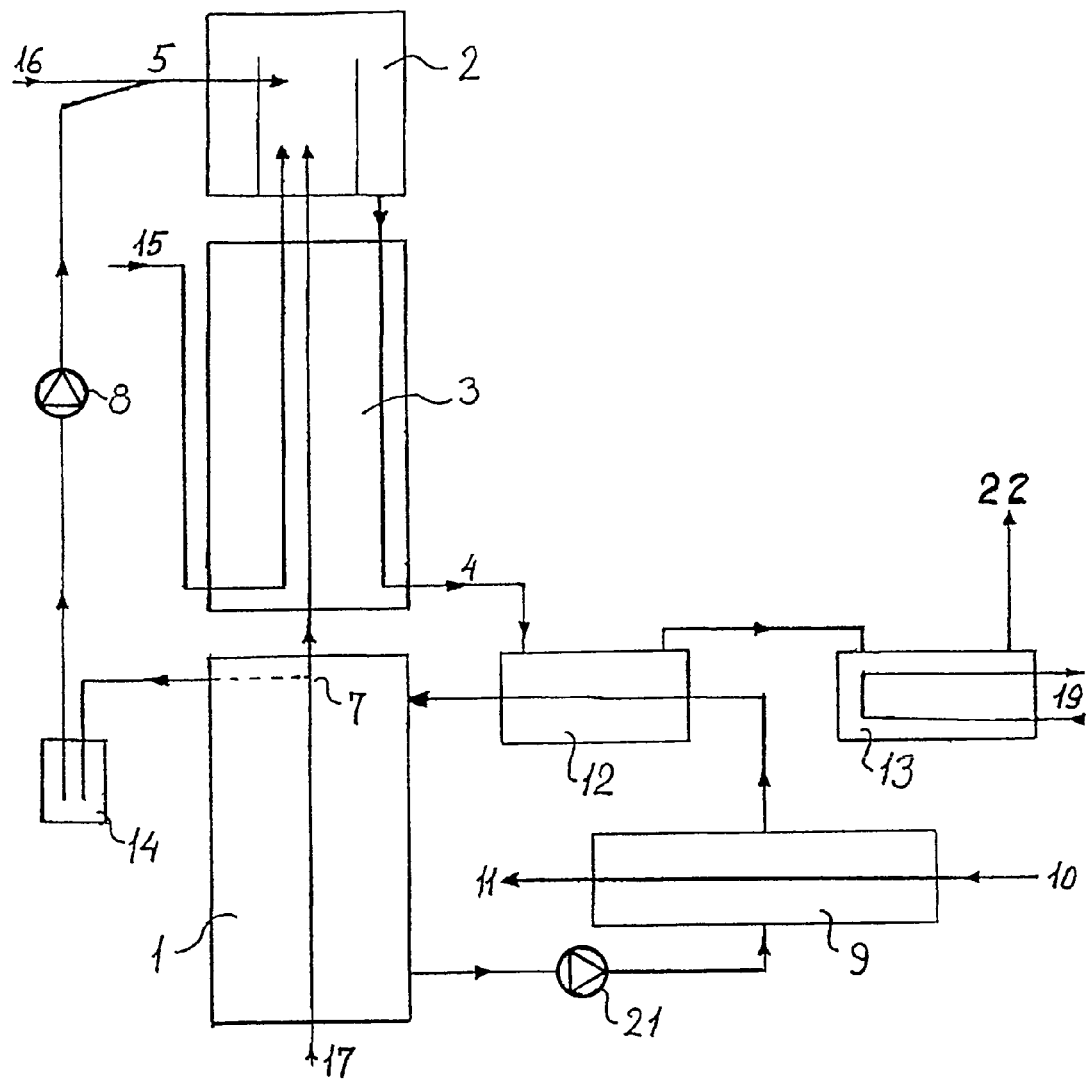

An alternative apparatus in accordance with the invention is shown in FIG. 2 in the form of a flow scheme, in which parts corresponding to the parts shown in FIG. 1 are supplied with corresponding numbers. The apparatus shown in FIG. 1 again comprises an evaporator 1, which is supplied with tar-containing water 17 and which evaporates this tar-containing water using a closed loop of pressurized hot water for the heating, said hot water being heated by means of exhaust 10 from one or more engines, e.g. driven by gas from a biomass gasification plant, said heat being extracted from the exhausted gas in an exhaust boiler 9, said heating being supplemented by heat extracted from the cracked vapor 4 leaving the heat exchanger 3, extracting said heat in a separate heat exchanger 12. The evaporator 1 again ends up in a separator 7 separating out a concentrate which is delivered to a concentrate buffer tank 14 from which it can be pumped up to a burner 5 for this concentrate by means of a concentrate pump 8. The low-boiling-point part leaving the evaporator 1 after the separator 7 is subjected to heat exchange with cracked vapor from the reactor 2 in a heat exchanger 3, said heat exchanger 3 further comprising separate channels for pre-heating air 15 for use in the reactor 2. The reactor 2 is heated by means of the burner 5 supplied with air 16 for burning the concentrate from the buffer tank 14 and further heat is supplied by parts of the low-boiling-point part burning when coming into contact with the preheated air 15 in a first part of the reactor 2. The high temperature in the reactor 2 provides a cracking of the mixture supplied thereto and the high temperature cracked vapor leaving the reactor 2 supplies heat to the low-boiling-point part from the evaporator 1 and the air 15 for the reactor in the heat exchanger 3. The cracked vapor 4 leaving the heat exchanger 3 is supplied to the heat exchanger 12 in order to deliver energy to the hot water pressurized closed loop for heating the evaporator 1. After leaving the heat exchanger 12 the vapor can furthermore deliver energy to a district heating loop 19 using a heat exchanger 13 in which parts of the cracked vapor may condensate and other parts, e.g. non-condensable, light combustible parts of the cracked product from the reactor 2, are fed to a gas engine or gas turbine 22.

In a preferred process in the system shown in FIG. 2, the hot water pressurized loop extracts heat from the engine exhaust 10 in the exhaust boiler 9, whereby the water is heated up to a temperature of about 120° C. and this heat is transferred to the incoming tar-containing water 17 in the evaporator 1 resulting in vapor at the top of the evaporator at a temperature of about 107° C. In the separator 7, a liquid concentrate is separated and collected in a concentrate buffer tank 14 leaving a relatively clean steam, which is heated in the heat exchanger 3 to a temperature of about 450° C. in counterflow with cracked product and combustion gases leaving the reactor 2. In the heat exchanger 3, air or an inert gas 15, which may be preheated by passing through the mantle-cooling conduct for the heat exchanger 3, is heated to about the same temperature as the steam, when entering a first part of the reactor 2. The inert gas could be provided in the form of cooled exhaust gas 11. The possible hot air spontaneously ignites some of the organic compounds in this first part of the reactor 2 and further heat is added in order to raise the temperature in the reactor to about 800° C. The energy for this is provided by burning concentrate from the concentrate buffer tank 14 in the burner 5.

EXAMPLE

In connection with the cleaning of tar-containing water in connection with a gasifier, the following cleaning capabilities apply:

Typical Inlet Conditions
Acetic acid 14,200 mg/liter
formic acid 1900 mg/liter
causing an acidity of pH=2.03
phenol 730 mg/liter
guaiacol 1030 mg/liter
dehydroxy-benzen 1 1400 mg/liter
other phenols 2840 mg/liter
and further the PAH's:
naphthalene 0.45 mg/liter
antracene/pheantrene<0.005 mg/liter
the total organic carbon content (TOC) is 45,900 mg/liter Typical Exit Conditions The original contaminated water is separated into two streams:

A heavily contaminated fraction (about 10%) with a TOC of about 300,000 mg/liter and gross calorific value of about 13 MJ/kg (65-75% of this will be reused internally in the process—the rest may be burned in auxiliary boilers in the plant during district heating peak loads).

A clean condensate with a TOC below 15 mg/liter, a total phenol content below 0.15 mg/liter and an acidity of pH=6.90 to 7.10 (thereby eliminating the need of neutralization).

EXAMPLE 2

In a plant corresponding to FIG. 1, 1266 kg/hour of waste water is boiled in the evaporator 1 heated on the outside using clean steam 4 at a temperature of about 550° C. and a pressure of 102 kPa leaving the heat exchanger 3. The waste water leaves the evaporator 1 as:

steam 1152 kg/hour at about 97° C. and 100 kPa, which after the droplet separator 7 is compressed in a high-pressure fan 6 to about 105° C. and 105 kPa, a combustible concentrate 114 kg/h of which the major fraction is used in the process at the burner 5 as described above. The steam part is heated in the heat exchanger 3 in counterflow with steam leaving the reactor 2 to about 380° C. and 104 kPa. After the heat exchanger, the temperature is raised to 800° C. using about 81 kg/h of the combustible concentrate burned off in the burner 5. Based on 0.305 kg/MJ, about 320 kg/h air 16 is used at this point. In the FIG. 1 apparatus, the burner 5 burns directly inside the reactor 2 thereby promoting turbulence and elimination of remaining tar traces in the steam. The steam leaving the reactor 2 will have a flue gas content of about 22%, which will reduce the performance of the steam-heated evaporator due to the presence of inert gases. These inert gases will have to be withdrawn from the top shell part of the evaporator 1 in order to improve condensation heat transfer to the evaporator. The purified water 18 leaving the evaporator 1 amounts to about 90% of the tar-containing water input 17.

The purified water has a TOC of about 14 mg/liter and contains about 0.4 mg/liter phenol, where regulations require below 15 mg/liter.

Although the invention above has been described in connection with preferred embodiments thereof, it will be evident for a man skilled in the art that several modifications are possible within the scope of the invention.

EXAMPLE 3

By operating the evaporator in a way to admit a larger fraction of organic contaminants in the steam from the evaporator or alternatively (or additionally) inject part of or all of the separated tar-contaminants from the separator directly into the reaction chamber, which is being held at low stoechiometric conditions, the tar components will be cracked into lighter combustible gases. When the tar-water cleaning system described is used in connection with a gasifier these gases might subsequently be added to the gas cleaning system of the associated gasifier and increase overall power efficiency.

The invention claimed is:

1. Method for cleaning tar-bearing waste water, where the waste water is a mixture of water and hydrocarbons, comprising in sequence the steps of:
   a) separating the mixture into a low-boiling-point part and a high-boiling-point part, and then bringing the low-boiling-point part to vapor form,
   b) cracking high molecular hydrocarbons from the low-boiling-point part in vapor form, thereby completely converting the hydrocarbons therein to products that are in vapor form at atmospheric pressure and ambient temperature, which products are light combustible and can be utilized in gas engines, gas turbines or the like,
   c) condensing the water contents of the cracked low-boiling-point part, thus separating the cracked low-boiling-point part into clean water and light combustible hydrocarbons.

2. Method in accordance with claim 1, further comprising after the condensing step the subsequent step of:
   d) cracking high molecular hydrocarbons from the high-boiling-point part, thereby converting the hydrocarbons therein to products that are in vapor form at atmospheric pressure and ambient temperature, which products are light combustible and can be utilized in gas engines, gas turbines or the like.

3. Method in accordance with claim 1, wherein said separating the mixture step includes the steps of:
   a1) completely evaporating the mixture, and
   a2) condensing and separating of the high-boiling-point part.

4. Method in accordance with claim 1, wherein said separating the mixture step includes the step of:
   a3) portionwise boiling off the low-boiling-point part of the mixture, leaving the high-boiling-point part as a residue.

5. Method in accordance with claim 1, wherein said cracking the high molecular hydrocarbons step includes the step of burning of at least part of the high-boiling-point part to provide the high temperature for the cracking of the high molecular hydrocarbons.

6. Method in accordance with claim 5, wherein said cracking the high molecular hydrocarbons step includes the step of burning or cracking of at least part of the high-boiling-point part directly in the vaporized low-boiling point part to be cracked.

7. Method in accordance with claim 5, wherein said cracking the high molecular hydrocarbons step includes the step of burning of the high-boiling-point part to provide an indirect heating of the vaporized low-boiling point part to be cracked.

8. Method in accordance with claim 1, further comprising the step of exchanging heat between the cracked vapor produced in the cracking step and the vaporized low boiling-point part produced in the separating the mixture step.

9. Method in accordance with claim 1, further comprising the step of using at least part of the cracked vapor produced in the cracking step to provide energy for an evaporation of the waste-containing water in the separating the mixture step.

10. Method in accordance with claim 1, wherein the hydrocarbons comprise polyaromatic hydrocarbons and phenols.

11. Method in accordance with claim 2, wherein the hydrocarbons comprise polyaromatic hydrocarbons and phenols.

* * * * *